Oct. 15, 1968  W. E. HAPPEL  3,405,576
DISENGAGING MEANS FOR WORK DRIVING DOGS
Filed March 23, 1966  3 Sheets-Sheet 1

INVENTOR
WILLIAM E. HAPPEL
BY
ATTORNEY

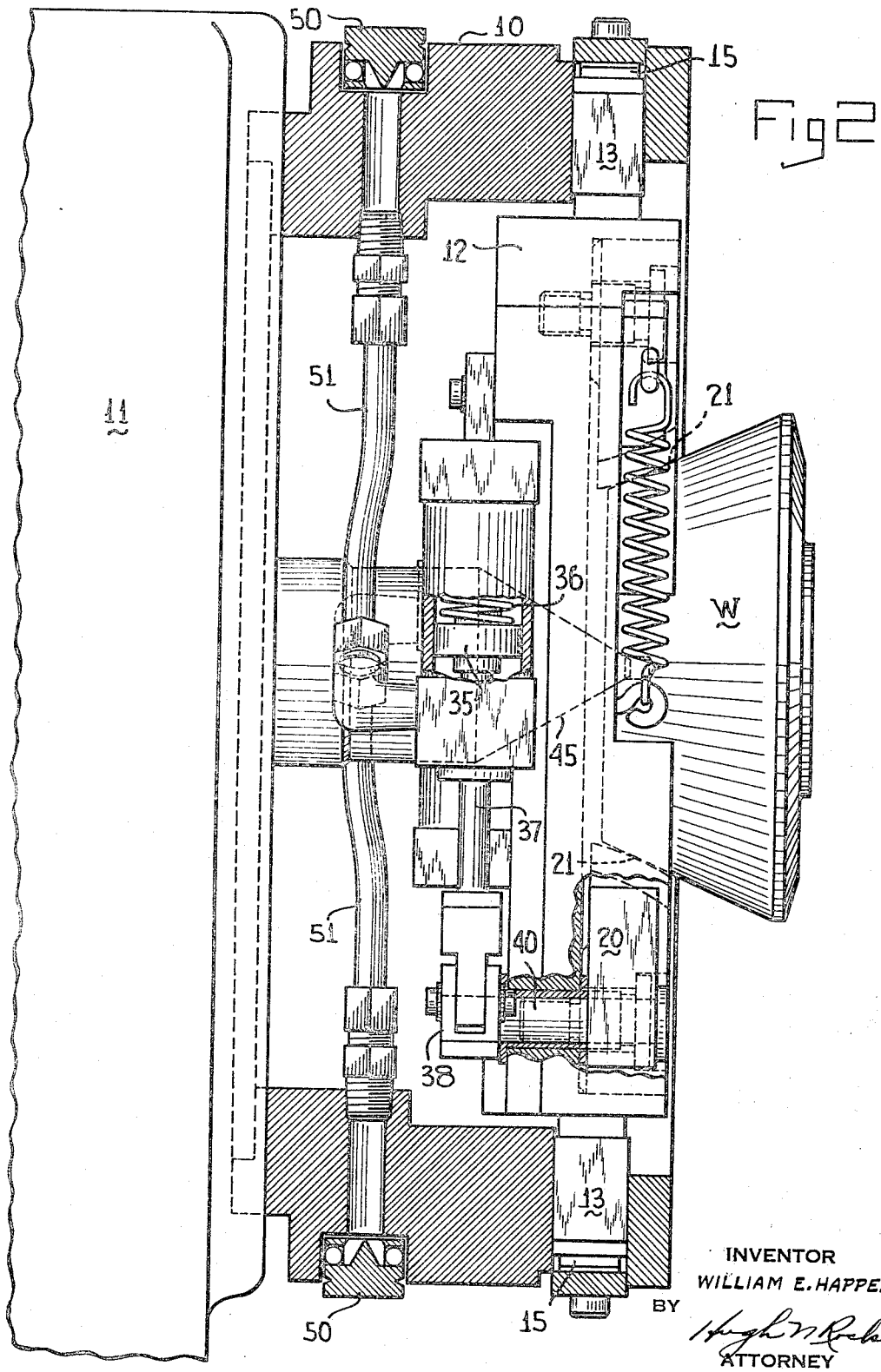

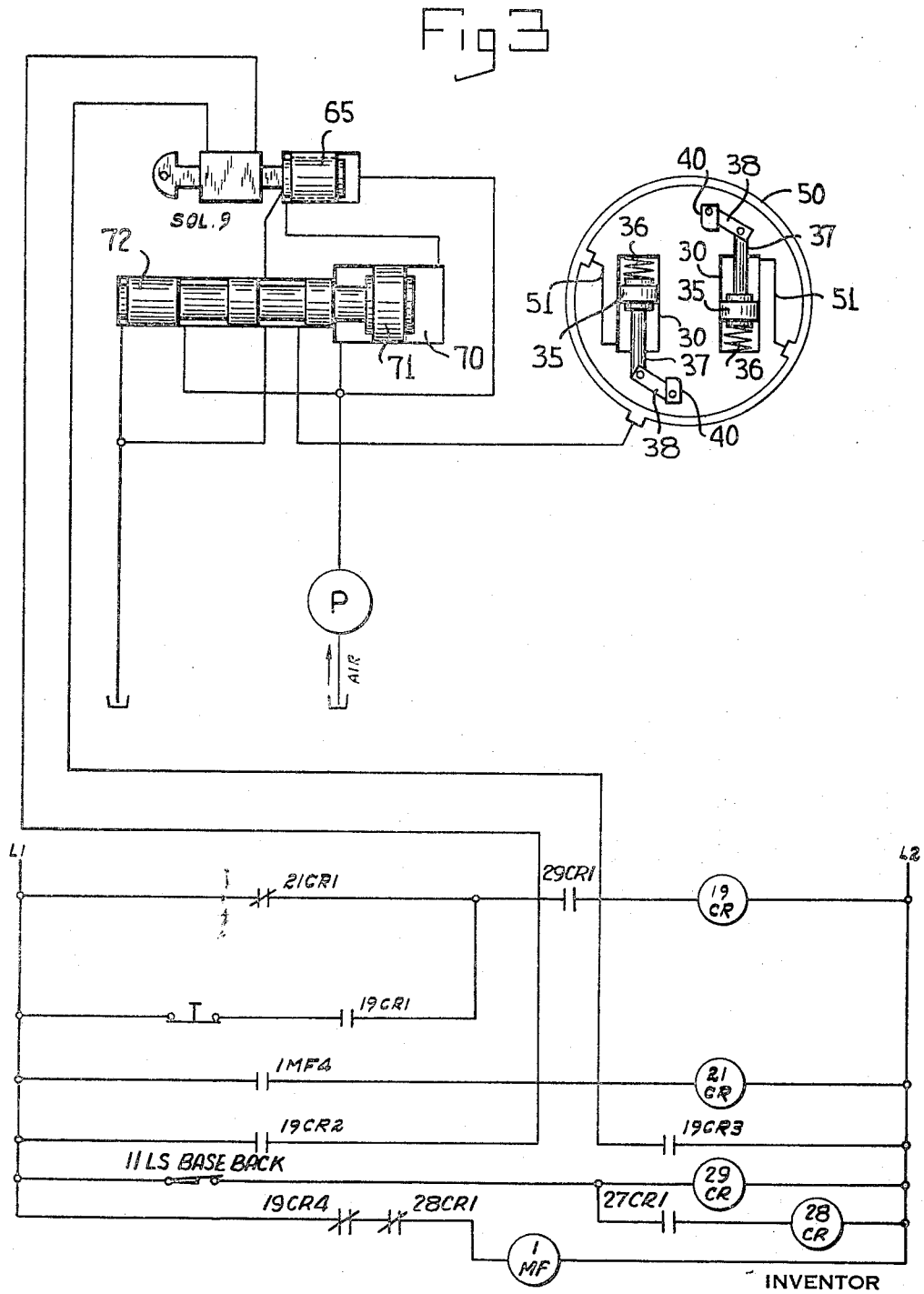

United States Patent Office
3,405,576
Patented Oct. 15, 1968

3,405,576
DISENGAGING MEANS FOR WORK
DRIVING DOGS
William E. Happel, Waynesboro, Pa., assignor to
Landis Tool Company, Waynesboro, Pa.
Filed Mar. 23, 1966, Ser. No. 536,909
2 Claims. (Cl. 82—40)

ABSTRACT OF THE DISCLOSURE

The apparatus of this disclosure consists of more or less conventional work driving dogs pivotally mounted on a driving member which is resiliently supported so as to permit a slight radial movement to accommodate irregularities in the portion of the workpiece engaged by said driving dogs. Each driving dog is urged into work gripping position by a spring-operated cam or equivalent device. Rotation of the face plate causes the driving dogs to grip the workpiece firmly. At the end of a machining operation, fluid pressure is conducted through a suitable coupling to piston and cylinder devices mounted on the face plate to rotate cam members against said driving dogs in a direction opposite to said spring-operated cam members to shift said driving dogs out of gripping engagement with the workpiece. The fluid pressure-operated piston and cylinder devices may also be used directly on the driving dogs without intervening cam members. Means for shifting the driving dogs out of gripping engagement with a workpiece, is operable whether the face plate is rotating or at rest.

This invention relates to a work driving device for use on lathes, grinders, and similar machine tools.

The device consists of a pair of oppositely disposed driving dogs pivotally mounted on a portion of the face plate and having work engaging surfaces shaped in such a manner that upon rotation of the face plate, the driving dogs grip and rotate the workpiece which is supported on centers.

With this type of work driver, a certain amount of force is required to release the workpiece from the driving dogs after rotation of the face plate has stopped. In some cases, release is effected by manually rotating the workpiece or face plate in the direction opposite to the direction of rotation for driving the workpiece. In other cases, a braking device and other power means are used to cause relative rotation of the face plate and driving dogs in a direction to release the workpiece. In still other cases, the driving dogs or jaws are retracted positively by cam devices actuated by rods running through the work drive spindle.

It is, therefore, an object of the present invention to provide means for releasing a workpiece from the driving dogs which does not require a braking action, reverse rotation of the face plate or workpiece, or actuating means in the work drive spindle.

Another object is to provide an attachment consisting of fluid pressure actuating means for shifting the driving dogs out of engagement with a workpiece.

In its preferred form, the invention consists of more or less conventional work driving dogs pivotally mounted on a driving member which is resiliently supported so as to permit a slight radial movement to accommodate irregularities in the portion of the workpiece engaged by said driving dogs. Each driving dog is urged into work gripping position by a spring-operated cam or equivalent device. Rotation of the face plate causes the driving dogs to grip the workpiece firmly. At the end of a machining operation, fluid pressure is conducted through a suitable coupling to piston and cylinder devices mounted on the face plate to rotate cam members against said driving dogs in a direction opposite to said spring-operated cam members to shift said driving dogs out of gripping engagement with the workpiece. The fluid pressure-operated piston and cylinder devices may also be used directly on the driving dogs without intervening cam members.

FIG. 2 is a front elevation, partly in section.

FIG. 3 is a pneumatic and electrical circuit diagram.

Figure 1:
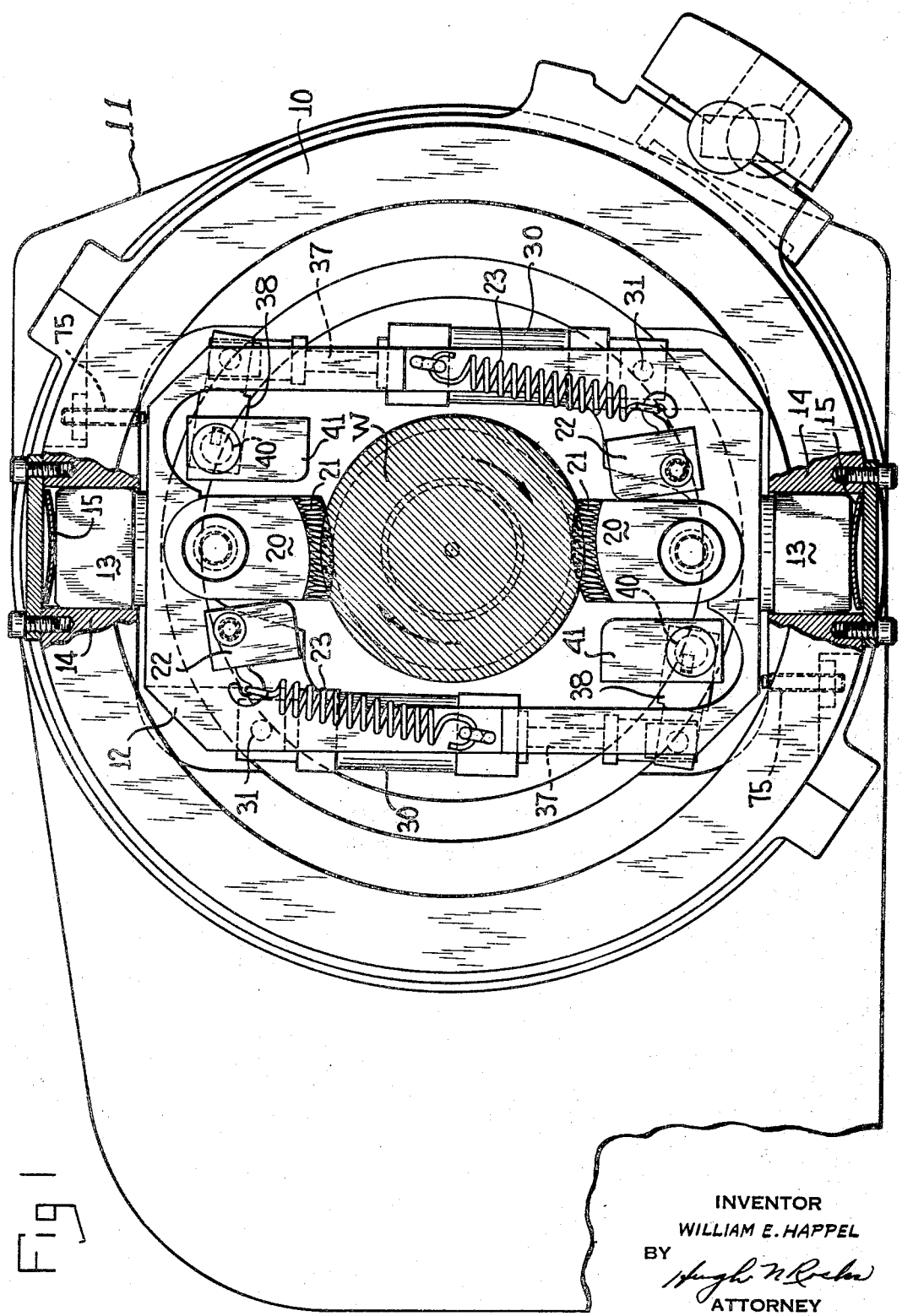
FIG. 1 is an end elevation of a headstock showing the invention mounted thereon.

As shown in the drawings, the invention consists of a ring-like body member 10 attached to a face plate and spindle (not shown) and rotatably mounted in headstock 11.

A work drive member 12 is supported in body member 10 by oppositely disposed pilot members 13 slidably mounted in guide portions 14 in body member 10.

Spring members 15 acting on pilot members 13 tend to hold the work drive member 12 yieldingly in a central position.

Work drive member 12 has driving dogs 20 pivotally mounted thereon, each having work engaging surfaces 21 shaped in a manner to grip workpiece W and urged in a counter-clockwise direction by cam members 22 pivotally mounted on work drive member 12 and urged into engagement with driving dogs 20 by means of springs 23.

Work drive member 12 is movable transversely of workpiece W in response to irregularities in the surface of the portion engaging driving dogs 20. The extent of this movement is limited by adjustable stop screws 75.

The means for disengaging the driving dogs 20 from workpiece W at the end of a machining operation consists of cylinders 30 pivotally mounted on work drive member 12 at 31. In each cylinder 30, there is a piston 35 actuated in one direction by spring 36 and in the opposite direction by fluid under pressure. Piston 35 is connected through a piston rod 37 to a link 38, one end of which is keyed to shaft 40 which is rotatably mounted in work drive member 12. At the end of shaft 40 is a cam 41 arranged to engage and shift driving dog 20 in opposition to the spring-actuated cam member 22.

In this particular case, workpiece W is a blank for a bevel gear radially located on headstock center 45. The work engaging surface 21 of driving dogs 20 is curved in cross-section so that it has firm contact with workpiece W regardless of the angle of the bevel. Furthermore, because of this curved transverse surface, the driving dog 20 exerts a substantial component of gripping force at right angles to the bevelled surface of workpiece W.

Fluid under pressure is conducted through a sealed coupling 50 and fluid lines 51 connected to the rod end of each of the cylinders 30.

Operation

When the wheelbase (not shown) is in back position, it actuates limit switch 11LS, closing a circuit to energize control relay 29CR.

At the same time, it completes a circuit through previously closed contact 27CR1 to energize relay 28CR.

Normally closed contact 28CR1 opens in the circuit to the work drive motor relay IMF, stopping the motor (not shown).

Contact IMF4 opens to deenergize relay 21CR, closing normally closed contact 21CR1 to complete a circuit through previously closed contact 29CR1 to energize work driver relay 19CR and work driver valve solenoid 9, shifting pilot valve 65 to the right and connecting the right hand end of valve actuating cylinder 70 to exhaust.

Contact 19CR1 is a holding contact.

Constant presure on the left hand side of cylinder 70 shifts piston 71 and valve 72 to the right, directing fluid under pressure from pump P through cylinder 70 to coupling 50 in body member 10 which is connected through lines 51 to cylinders 30.

Pistons 35 in said cylinders 30 are connected through piston rods 37 and by links 38 to dog releasing cams 41. The pistons 35 are actuated against springs 36 to rotate cams 41 in clockwise direction against their respective driving dogs 20, shifting said driving dogs in a clockwise direction against cam members 22 and out of contact with workpiece W.

From this, it can be seen that in order to actuate the driving dogs 20, the wheelbase (not shown) must be back, closing limit switch 11LS and energizing relay 29CR and the motor (not shown) must be stopped, deenergizing relay 21CR in order to energize relay 19CR and valve solenoid 9 to shift the driving dogs 20 out of contact with workpiece W.

I claim:
1. In a machine tool having
   (a) a rotatable spindle,
   (b) a work driver comprising
   (c) a member rotatable with said spindle,
   (d) work engaging jaws angularly spaced on said rotatable member, each jaw being pivotally supported at one end on said rotatable member and having a work gripping portion at the other end,
   (e) resilient means engaging one side of each of said jaws between the pivot point and the work gripping portion for urging said jaws into gripping relation with a workpiece,
   (f) means for engaging the other side of each of said jaws in direct opposition to said resilient means and operable in opposition to said resilient means for disengaging said jaws from said workpiece,
   (g) and means for actuating said disengaging means regardless of whether said rotatable member is rotating or at rest.
2. A device of the type described in claim 1 having
   (a) a non-rotatable member adjacent said rotatable member,
   (b) means for introducing fluid under pressure through said non-rotatable member,
   (c) a clearance space between said rotatable member and said non-rotatable member for receiving said fluid under pressure,
   (d) and connections between said clearance space and said jaw disengaging means.

References Cited
UNITED STATES PATENTS

| | | | |
|---|---|---|---|
| 1,072,142 | 9/1913 | Miller | 82—42 XR |
| 2,093,757 | 9/1937 | Godfriaux | 82—40 |

LEONIDAS VLACHOS, *Primary Examiner.*